(12) United States Patent
Cheng

(10) Patent No.: US 8,791,691 B2
(45) Date of Patent: Jul. 29, 2014

(54) FULLY DIFFERENTIAL SIGNAL PEAK DETECTION ARCHITECTURE

(75) Inventor: Zichuan Cheng, Kanata (CA)

(73) Assignee: LSI Corporation, Milpitas, CA (US)

( * ) Notice: Subject to any disclaimer, the term of this patent is extended or adjusted under 35 U.S.C. 154(b) by 554 days.

(21) Appl. No.: 13/070,554

(22) Filed: Mar. 24, 2011

(65) Prior Publication Data

US 2012/0242327 A1 Sep. 27, 2012

(51) Int. Cl.
  *G01R 13/00* (2006.01)
  *H04L 25/02* (2006.01)
  *H04L 25/06* (2006.01)

(52) U.S. Cl.
  CPC .......... *H04L 25/0298* (2013.01); *H04L 25/062* (2013.01)
  USPC ........ 324/140 R; 324/76.52; 327/63; 327/18; 327/47; 327/58; 327/60; 327/65

(58) Field of Classification Search
  USPC ............ 324/140 R, 76.52, 120, 73.1; 327/40, 327/42, 56, 58, 65, 68, 77, 317, 333, 18–21, 327/47–49, 60, 63, 307, 507; 326/33, 83
  See application file for complete search history.

(56) References Cited

U.S. PATENT DOCUMENTS

| | | | | |
|---|---|---|---|---|
| 4,363,977 A | * | 12/1982 | Tsuda et al. ..................... 327/73 |
| 5,214,319 A | * | 5/1993 | Abdi ................................ 327/58 |
| 5,491,434 A | * | 2/1996 | Harnishfeger et al. .......... 327/50 |
| 5,701,331 A | * | 12/1997 | Hunt ............................. 375/316 |
| 5,825,239 A | * | 10/1998 | Adal ............................. 327/563 |
| 5,828,240 A | * | 10/1998 | Smith ............................. 327/62 |
| 5,864,587 A | * | 1/1999 | Hunt ............................. 375/316 |
| 6,041,084 A | * | 3/2000 | Nagaraj ......................... 375/317 |
| 6,194,965 B1 | * | 2/2001 | Kruczkowski et al. ....... 330/258 |
| 6,211,716 B1 | * | 4/2001 | Nguyen et al. ................ 327/307 |
| 6,522,160 B1 | * | 2/2003 | Zivanovic ....................... 326/33 |
| 6,653,870 B2 | * | 11/2003 | Nakada ........................... 327/58 |
| 6,671,075 B1 | * | 12/2003 | Mizunaga ..................... 398/202 |
| 6,781,465 B1 | * | 8/2004 | Berzins et al. ................ 330/258 |
| 6,859,645 B2 | * | 2/2005 | Yu ................................. 455/222 |
| 6,897,700 B1 | * | 5/2005 | Fu et al. ........................ 327/307 |
| 7,064,585 B2 | * | 6/2006 | Glass .............................. 327/58 |
| 7,227,399 B2 | * | 6/2007 | Ajram et al. .................. 327/333 |
| 7,236,014 B1 | * | 6/2007 | McQuirk et al. ............... 327/58 |

(Continued)

OTHER PUBLICATIONS

Kimmo Koli, CMOS Current Amplifiers: Speed versus Nonlinearity, Nov. 13, 2000, Helsinki University of Technology Electronic Circuit Design Laboratory.*

(Continued)

*Primary Examiner* — Patrick Assouad
*Assistant Examiner* — Alexander J Nemtzow

(57) ABSTRACT

A signal detector includes a summation unit connected to offset first and second input signals representing a differential input signal into two offset pairs of first and second signals. The signal detector also includes a detection unit connected to select the first signal from one of the offset pairs of first and second signals and the second signal from the other of the offset pairs in an overlap portion of the first and second signals to form a complementary pair of overlap signals and provide a differentially peak-detected output signal from the complementary pair of overlap signals. Additionally, the signal detector includes a comparator connected to provide a detection output signal corresponding to the differentially peak-detected output signal and a reference signal. A method of operating a signal detector is also included.

18 Claims, 6 Drawing Sheets

(56) References Cited

U.S. PATENT DOCUMENTS

| | | | |
|---|---|---|---|
| 7,271,652 B2* | 9/2007 | Ozasa et al. | 330/253 |
| 7,348,808 B2* | 3/2008 | Moussavi | 327/77 |
| 7,471,107 B1* | 12/2008 | Fortin et al. | 326/83 |
| 7,525,347 B1* | 4/2009 | Luo | 327/58 |
| 7,653,367 B2* | 1/2010 | Song et al. | 455/218 |
| 7,692,453 B2* | 4/2010 | Ajram et al. | 327/65 |
| 7,782,095 B2* | 8/2010 | Hsiung et al. | 327/72 |
| 7,969,195 B1* | 6/2011 | Fortin et al. | 326/83 |
| 8,391,420 B1* | 3/2013 | An et al. | 375/326 |
| 2007/0126480 A1* | 6/2007 | McQuirk et al. | 327/58 |
| 2008/0094122 A1* | 4/2008 | Karim | 327/407 |
| 2008/0143439 A1* | 6/2008 | Tanimoto et al. | 330/253 |
| 2009/0086857 A1* | 4/2009 | Wu | 375/345 |
| 2009/0140899 A1* | 6/2009 | Ceballos et al. | 341/143 |
| 2009/0153219 A1* | 6/2009 | Wu et al. | 327/333 |
| 2012/0086494 A1* | 4/2012 | Asada et al. | 327/307 |

OTHER PUBLICATIONS

Joyner et al., A CMOS Analog Front-end Receiver with Desensitization to Input Capacitance for Broadband Optical Wireless Communication, Sep. 2009, Academy Publisher, vol. 4 No. 8, 572-581.*

Vishnu B. Kulkarni, Low-Voltage CMOS Comparators With Programmable Hysteresis, Oct. 10, 2005, New Mexico State University.*

Dowlatabadi et al., A generic Voltage Comparator Analog Cell Produced in Standard Digital CMOS Technologies, 1997, IEEE, 35-38.*

Edwards et al., A High Speed Offse-Compensated Differential Comparator in Floating Body CMOS SOS Technology for Radiation Hard Switched-Capacitor Systems, Oct. 1997, IEEE International SOI Conference, 160-161.*

Morris et al., PHY Interface for the PCI Express, SATA, and USB 3.0 Architectures V 4.0, 2007-2011, Intel Corporation.*

* cited by examiner

FULLY DIFFERENTIAL SIGNAL PEAK DETECTION ARCHITECTURE

TECHNICAL FIELD

This application is directed to signal processing in general, and more specifically, to a signal detector and a method of operating a signal detector.

BACKGROUND

A universal serial bus (USB) provides a communication link between a host and a connected device. When a USB receiver termination is present between the host and the connected device but no signaling is present on the USB communication link, an electrical idle state is present on the link. In this state, low frequency periodic signaling (LFPS) is used to signal initiation and power management information over the link. Conventional LFPS detection employs AC coupled, single-ended detection schemes that exhibit several drawbacks. For example, the AC coupling restricts usage of the LFPS at some lower frequency point. Additionally, longer electrical idle states can cause a single-ended peak detection signal to fall below a fixed reference comparison signal thereby providing an erroneous detection signal. Improvements to circumvent these and other drawbacks and provide additional functions would prove beneficial to the art.

SUMMARY

Embodiments of the present disclosure provide a signal detector and a method of operating a signal detector. In one embodiment, the signal detector includes a summation unit connected to offset first and second input signals representing a differential input signal into two offset pairs of first and second signals. The signal detector also includes a detection unit connected to select the first signal from one of the offset pairs of first and second signals and the second signal from the other of the offset pairs in an overlap portion of the first and second signals to form a complementary pair of overlap signals and provide a differentially peak-detected output signal from the complementary pair of overlap signals. Additionally, the signal detector includes a comparator connected to provide a detection output signal corresponding to the differentially peak-detected output signal and a reference signal.

In another aspect, the method of operating a signal detector includes offsetting first and second input signals representing a differential input signal into two offset pairs of first and second signals and selecting the first signal from one of the offset pairs of first and second signals and the second signal from the other of the offset pairs during an overlap portion of the first and second signals to provide a complementary pair of overlap signals. The method also includes detecting the complementary pair of overlap signals to provide a differentially peak-detected output signal and comparing the differentially peak-detected output signal to a reference signal to provide a detection output signal.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Embodiments of the present disclosure may be employed in a universal serial bus (USB) system such as one conforming to the USB 3.0 standard for low frequency periodic signaling (LFPS), for example. Additionally, embodiments may be employed for out-of-band (OOB) signaling applications such as one conforming to the SAS/SATA standard, for example.

Figure 1:
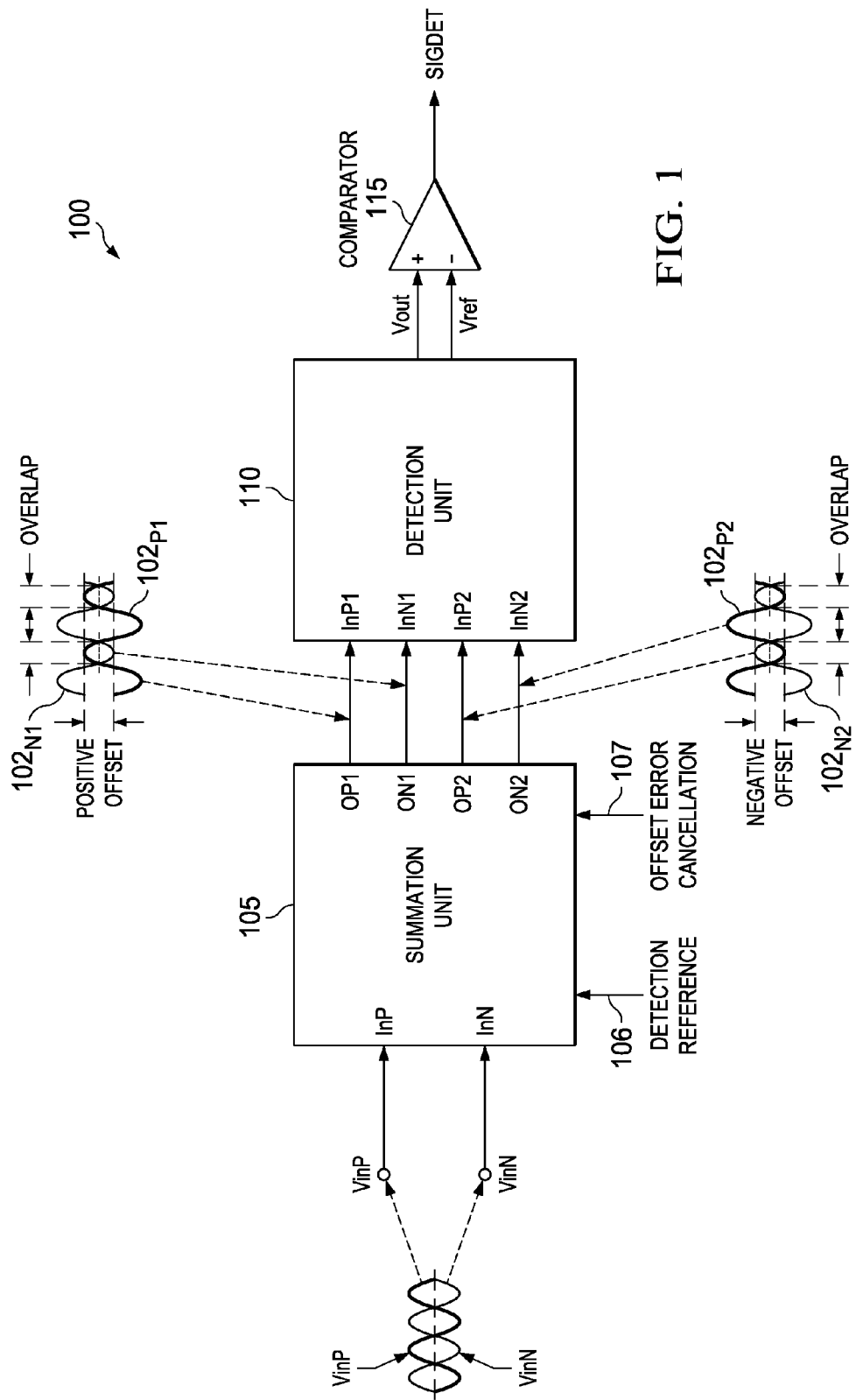
FIG. 1 illustrates a block diagram of a signal detector constructed according to the principles of the present disclosure.

FIG. 1 illustrates a block diagram of a signal detector, generally designated 100, constructed according to the principles of the present disclosure. Generally, the signal detector 100 is a fully differential peak detector and includes a summation unit 105, a detection unit 110 and a comparator 115.

The summation unit 105 provides fully differential conditioning of an input signal consisting of first and second input signals that represent a differential input signal. These signals and their subsequently generated signals typically have a 180 degree phase relationship to each other and will generally be referred to herein as positive and negative signals. Typically, these signals may be sinusoidal or rectangular waveforms. Positive and negative input signals VinP, VinN are applied to respective positive and negative summation unit inputs InP, InN, as shown. The summation unit 105 offsets (i.e., level-shifts) the positive and negative input signals VinP, VinN to provide two offset pairs of first and second signals $102_{P1}$:$102_{N1}$ and $102_{P2}$:$102_{N2}$ from respective first and second summation unit output pairs $O_{P1}$:$O_{N1}$ and $O_{P2}$:$O_{N2}$.

The two offset pairs $102_{P1}$:$102_{N1}$ and $102_{P2}$:$102_{N2}$ are offset in opposite directions where the offset pair $102_{P1}$:$102_{N1}$ is defined to have a positive offset, and the offset pair $102_{P2}$:$102_{N2}$ has a corresponding equal and opposite negative offset, as shown. Offsets having values greater than zero and corresponding to multiple sets of positive and negative signal detection levels are provided for the two offset pairs $102_{P1}$:$102_{N1}$ and $102_{P2}$:$102_{N2}$ through a detection reference input 106. Signal overlap regions are shown for the two offset pairs $102_{P1}$:$102_{N1}$ and $102_{P2}$:$102_{N2}$ indicating that peak magnitudes for the first and second signals are greater than the offset separating them. Additionally, offset error cancellation is provided through an offset error cancellation input 107.

In the illustrated embodiment, the detection unit 110 receives the two offset pairs of first and second signals $102_{P1}$:$102_{N1}$ and $102_{P2}$:$102_{N2}$ on detector unit input pairs $In_{P1}$:$In_{N1}$ and $In_{P2}$:$In_{N2}$. Generally, the detector unit 110 is connected to select the first signal from one of the offset pairs of first and second signals $102_{P1}$:$102_{N1}$ and $102_{P2}$:$102_{N2}$ and the second signal from the other of the offset pairs of the first and second signals $102_{P1}:102_{N1}$ and $102_{P2}:102_{N2}$. For example, if the first signal selected is signal $102_{P1}$, then the second signal selected is signal $102_{N2}$.

The detection unit 110 only processes received signals of the offset pairs of the first and second signals $102_{P1}:102_{N1}$ and $102_{P2}:102_{N2}$ that are in signal overlap regions (i.e., that are greater than the offset separating them). Therefore, in our selection example above, overlap portions of the first signal $102_{P1}$ and the second signal $102_{N2}$ form a complementary pair of overlap signals and provide a differentially peak-detected output signal Vout from this complementary pair of overlap signals. The comparator 115 is connected to provide a detection output signal SIGDET corresponding to the differentially peak-detected output signal Vout and a reference signal Vref.

Figure 2:
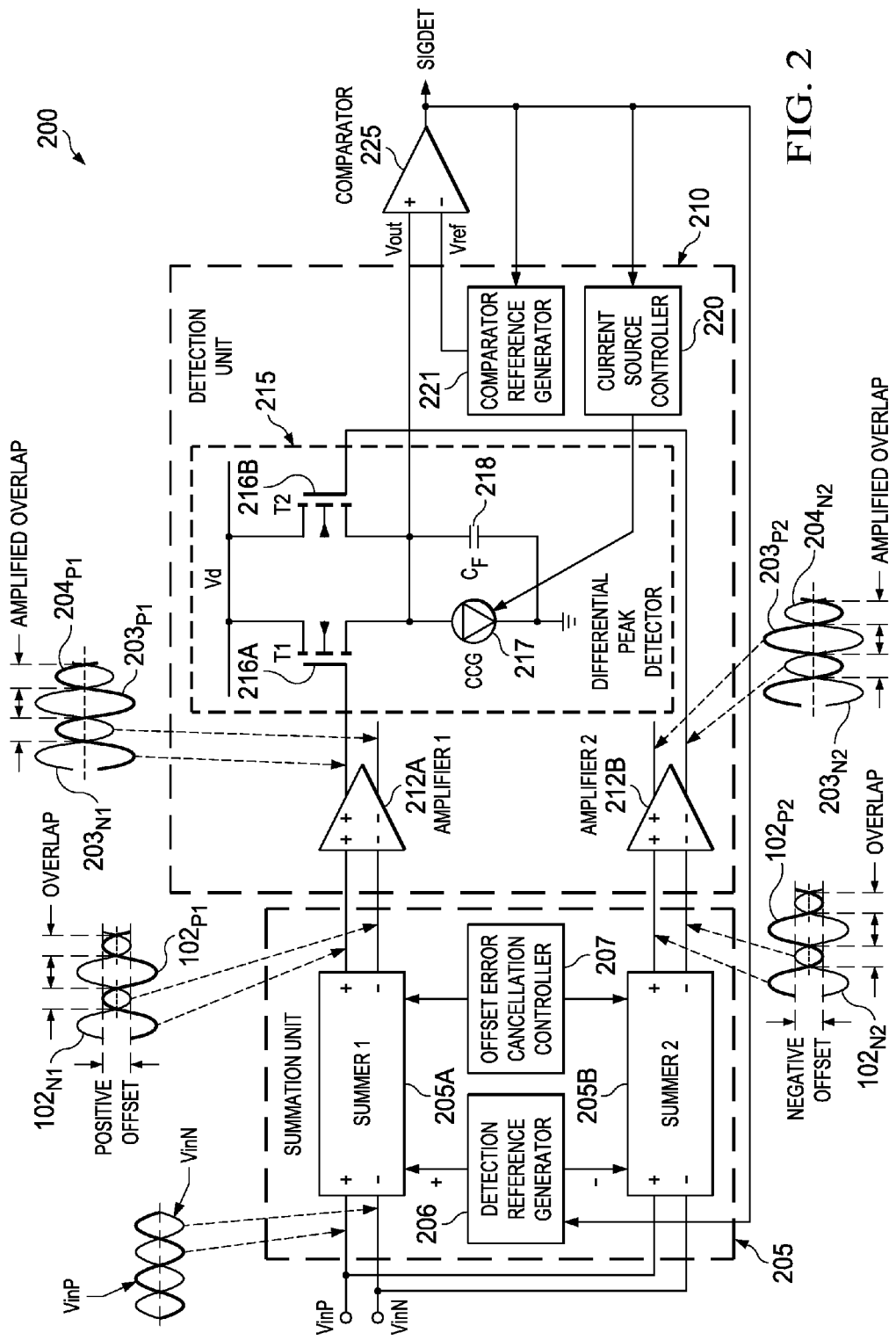
FIG. 2 illustrates an expanded block diagram of a signal detector constructed according to the principles of the present disclosure.

FIG. 2 illustrates an expanded block diagram of a signal detector, generally designated 200, constructed according to the principles of the present disclosure. The signal detector 200 is a fully differential peak detector that is representative of the peak detector 100 and includes a summation unit 205, a detection unit 210 and a comparator 225. The summation unit 205 includes first and second summers 205A, 205B, a detection reference generator 206 and an offset error cancellation controller 207. The detection unit 210 includes first and second differential amplifiers 212A, 212B, a differential peak detector 215, a current source controller 220 and a comparator reference generator 221.

Positive and negative input signals VinP, VinN are applied to respective positive and negative summation unit inputs of the first and second summers 205A, 205B, which are differential summers. The first and second summers 205A, 205B provide two offset pairs of first and second signals $102_{P1}:102_{N1}$ and $102_{P2}:102_{N2}$ from the positive and negative input signals VinP, VinN wherein the phase relationships of input and output signals are maintained. The first and second summers 205A, 205B provide detection reference offsets for the two offset pairs of first and second signals $102_{P1}:102_{N1}$ and $102_{P2}:102_{N2}$ in opposite directions with respect to one another. Additionally, some gain in signal amplitudes is also provided, in the illustrated embodiment.

The detection reference generator 206 may employ a digital-to-analog converter (DAC) to provide differential detection reference offsets wherein positive offsets are generated for the first summer 205A and negative offsets are generated for the second summer 205B. In the illustrated embodiment, eight differential detection reference offsets correspond to eight detection settings for the signal detector 200. These detection settings provide eight amplitude levels that the positive and negative input signals VinP, VinN are required to exceed before signal detection occurs.

Additionally, the detection reference generator 206 employs feedback from the comparator 225 to provide a moderate reduction in each specific offset level (i.e., a detection hysteresis not specifically shown in FIG. 2) when the detection output signal SIGDET becomes true indicating that a signal is detected. This action provides a more stable operation and a measure of noise immunity for each detection settings. The offset error cancellation controller 207 may also employ a DAC to provide offset error cancellation or compensation. This offset error may typically result from switches (e.g., transistors) employed in the first and second summers 205A, 205B.

In the illustrated embodiment, the detection unit 210 also provides some gain in signal amplitudes. Overlap portions of the two offset pairs of first and second signals $102_{P1}:102_{N1}$ and $102_{P2}:102_{N2}$ are amplified by the first and second differential amplifiers 212A, 212B, which are a cascade of differential stages. Recall that overlap portions are defined as those portions of signals that are greater in magnitude than the value of the detection reference offset supplied in the first and second summers 205A, 205B. Amplified offset pairs of first and second signals $203_{P1}:203_{N1}$ and $203_{P2}:203_{N2}$ again maintain phase relationships of the input and output signals VinP, VinN.

Amplified parts (e.g., a positive amplified signal $204_{P1}$ and a negative amplified signal $204_{N2}$) of the overlap portions form a complementary pair of overlap signals $204_{P1}:204_{N2}$ that is provided from two opposite phase outputs (i.e., the positive and negative outputs) of the separate differential amplifiers 212A, 212B to the differential peak detector 215. The other two opposite phase outputs (i.e., the negative and positive outputs) of the separate differential amplifiers 212A, 212B are not employed in the illustrated embodiment.

The differential peak detector 215 includes a controllable current source 217, a filter capacitor 218 and a pair of first and second MOS transistors 216A, 216B. The complementary pair of overlap signals $204_{P1}:204_{N2}$ is applied to the first and second transistors 216A, 216B, respectively, and rectified to provide a differentially peak-detected output signal Vout.

A charge and discharge rate of the controllable current source 217 is adjusted by the current source controller 220 based on feedback from the detection output signal SIGDET. When the detection output signal SIGDET is false (i.e., no signal detected), the controllable current source 217 is adjusted to provided a smaller current than when the detection output signal SIGDET is true. This action enhances detection sensitivity and provides some amplitude control of the differentially peak-detected output signal Vout, when detection occurs. The filter capacitor 218 provides electrical smoothing of detection transitions.

The comparator 225 compares the differentially peak-detected output signal Vout to a reference signal Vref. When the differentially peak-detected output signal Vout becomes greater than the reference signal Vref, the detection output signal SIGDET becomes true. The reference signal Vref is controlled by the comparator reference generator 221 corresponding to feedback from the detection output signal SIGDET. This control of the reference signal Vref is provided to make the DC component of the reference voltage Vref track with the change of the DC component of the differentially peak-detected detected output signal Vout such that they can compare at the same level.

Figure 3:
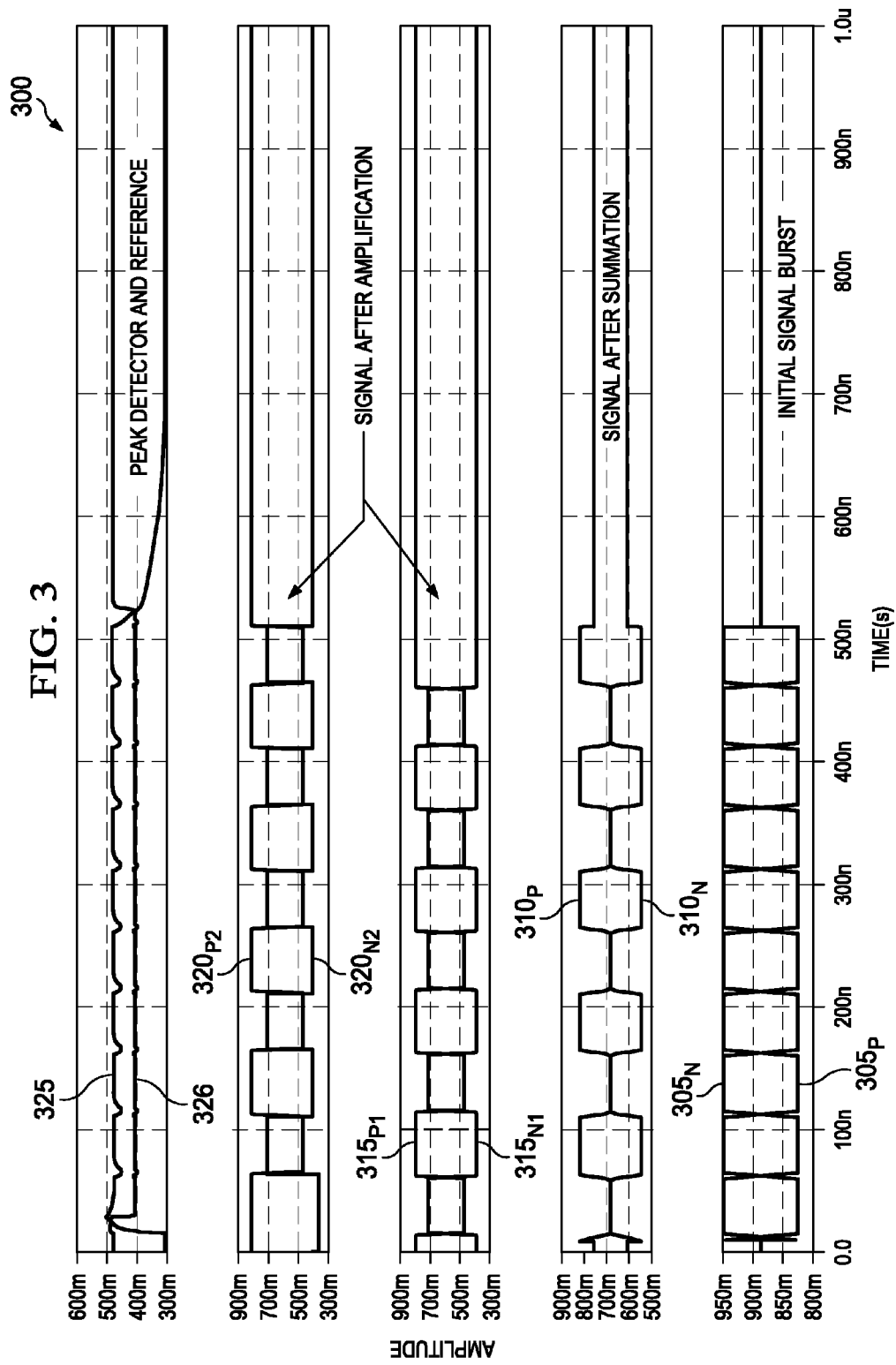
FIG. 3 illustrates a set of waveforms representative of the signal detector of FIG. 2.

FIG. 3 illustrates a set of waveforms, generally designated 300, representative of the signal detector 200 of FIG. 2. The set of waveforms 300 includes positive and negative input signals 305P, 305N, one offset pair of first and second multiplexer output signals 310P, 310N, amplified offset pairs of first and second output signals 315P1, 315N1 and 320P2, 320N2 corresponding to the signals discussed with respect to FIG. 2. The set of waveforms 300 also includes a differential peak-detected output signal (Vout) 325 and a reference signal (Vref) 326. Conditions in the first part of the waveforms 300 provide a true value for the detection output signal SIGDET and a false value for the detection output signal SIGDET in the second part. As seen in the waveforms 300, the reference signal 326 changes in a direction to enhance detection for a true value of the detection output signal SIGDET and returns to a greater value for a non-detection condition.

Figure 4:
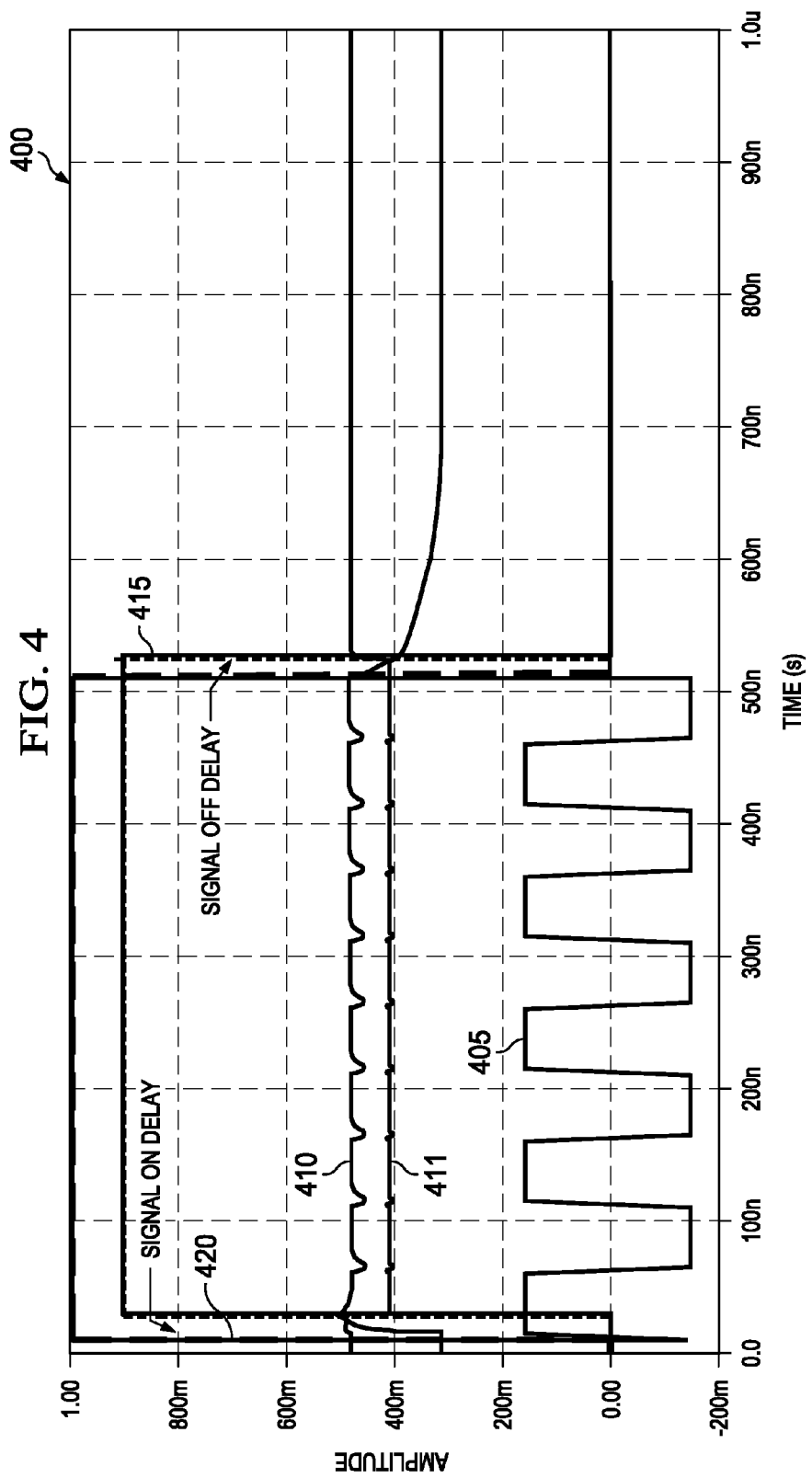
FIG. 4 illustrates another set of waveforms representative of the signal detector of FIG. 2.

FIG. 4 illustrates another set of waveforms, generally designated 400, representative of the signal detector 200 of FIG. 2. The set of waveforms 400 includes a differential signal 405 representative of the differential positive and negative waveforms of FIG. 2. The waveforms 400 also include a differential peak-detected output signal (Vout) 410, a reference signal (Vref) 411, a detection output signal (SIGDET) 415 and an input reference signal 420. Again, conditions in the first part of the waveforms 400 provide a true value for the detection output signal 415 and a false value in the second part. A leading and trailing delay for the detection output signal 415 is compared to the start of the differential signal 405 as denoted by the input reference signal 420.

Figure 5:
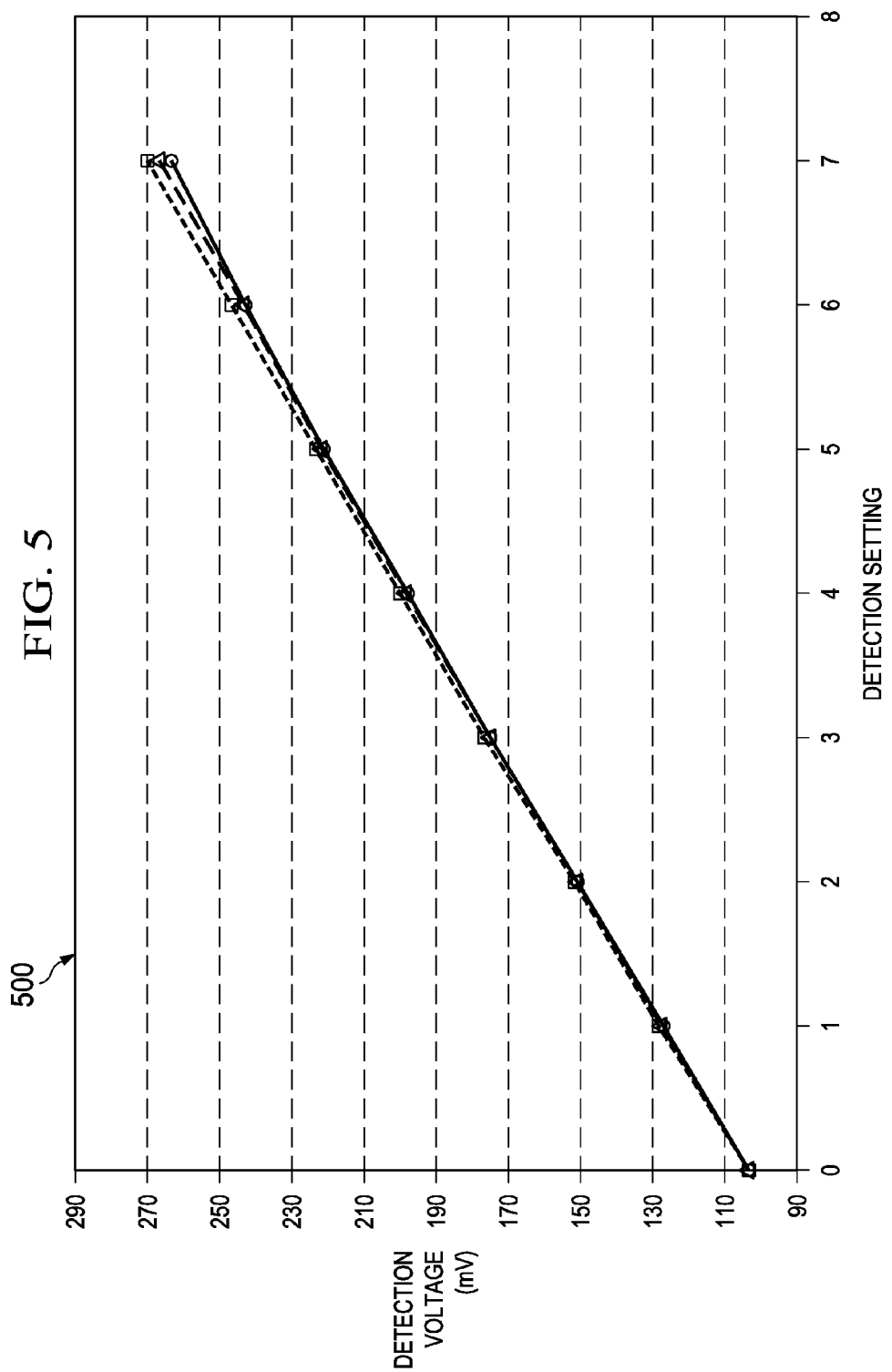
FIG. 5 illustrates a detection transfer graph representative of the signal detector of FIG. 2.

FIG. 5 illustrates a detection transfer graph, generally designated 500, representative of the signal detector 200 of FIG. 2. The detection transfer graph 500 indicates eight detection reference settings that allow signal detection at a corresponding eight different input signal amplitude levels. For example, at one end of the detection transfer graph 500 an input signal amplitude level of about 100 millivolts corresponds to a detection setting of zero. At the other end, an input signal amplitude level of about 270 millivolts corresponds to a detection setting of seven. The detection transfer graph 500 shows three different curves corresponding to three different working conditions representing minimum, medium and maximum test conditions for temperature and supply voltage values.

Figure 6:
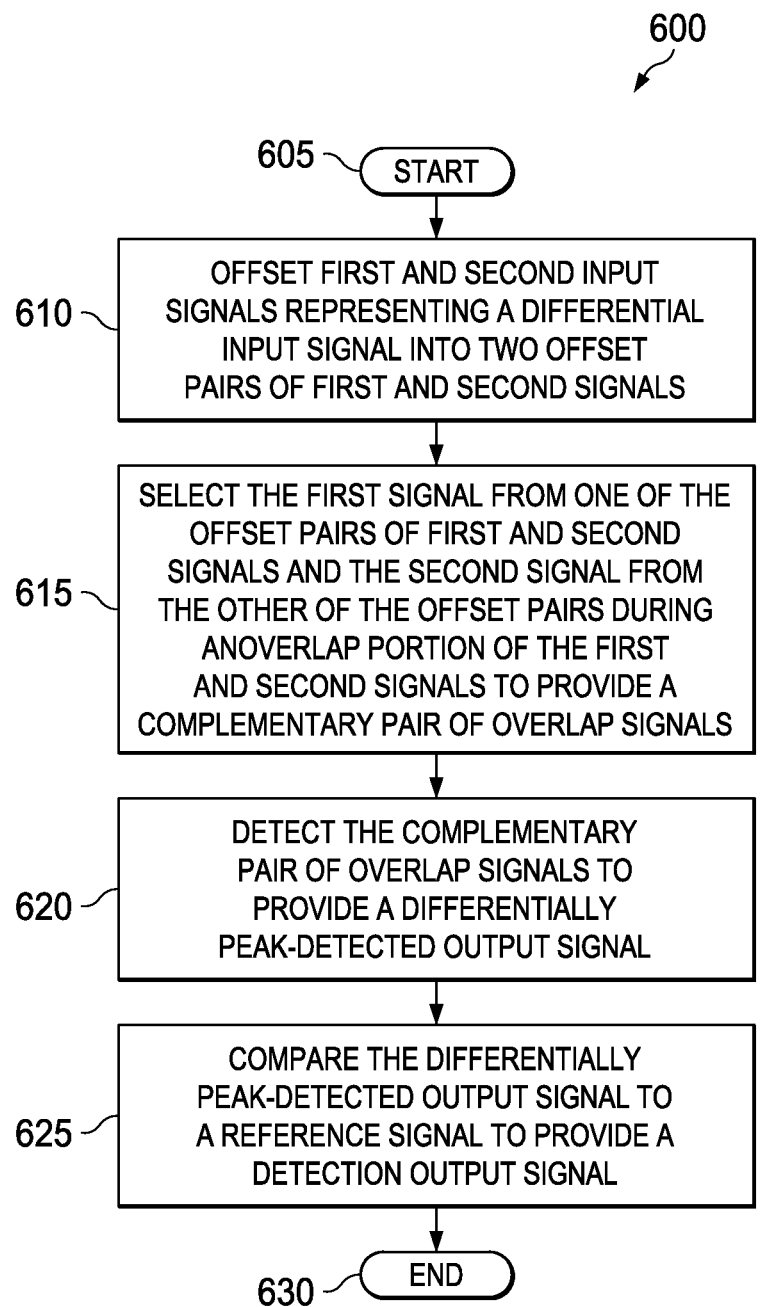
FIG. 6 illustrates a flow diagram of an embodiment of a method of operating a signal detector carried out according to principles of the present disclosure.

FIG. 6 illustrates a flow diagram of an embodiment of a method of operating a signal detector, generally designated 600, carried out according to principles of the present disclosure. The method 600 is for use with a differential signal and starts in a step 605. Then, in a step 610, first and second input signals representing a differential input signal are offset into two offset pairs of first and second signals. The first signal from one of the offset pairs of first and second signals and the second signal from the other of the offset pairs are selected during an overlap portion of the first and second signals to provide a complementary pair of overlap signals, in a step 615. The complementary pair of overlap signals is detected to provide a differentially peak-detected output signal, in a step 620, and the differentially peak-detected output signal is compared to a reference signal to provide a detection output signal, in a step 625.

In one embodiment, offsetting the two offset pairs of first and second signals provides offsets that are in opposite directions with respect to one another. Additionally, offsetting the two offset pairs of first and second signals provides offsets that are generated by a detection reference generation signal based on digital-to-analog conversation wherein a reduction in offset error is provided through offset error cancellation that is also based on digital-to-analog conversion. Further, the detection reference generation signal provides reduction in the offset itself when the detection output signal becomes true. In another embodiment, providing the complementary pair of overlap signals uses separate differential amplifiers wherein opposite phase outputs of the separate differential amplifiers are employed.

In yet another embodiment, providing the differentially peak-detected output signal uses a differential pair of rectifiers employing a controllable current source wherein current in the controllable current source is adjusted by a current source control signal that is based on a state of the detection output signal. In still another embodiment, the reference signal is provided by a comparator reference generation signal that is based on a state of the detection output signal. The method 600 ends in a step 630.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A signal detector, comprising:
 a summation unit connected to offset first and second input signals representing a differential input signal into two offset pairs of first and second signals;
 a detection unit connected to select the first signal from one of the offset pairs of first and second signals and the second signal from the other of the offset pairs in an overlap portion of the first and second signals to form a complementary pair of overlap signals and provide a differentially peak-detected output signal from the complementary pair of overlap signals, wherein the differentially peak-detected output signal is provided by a differential peak detector having a pair of MOS transistors connected to a controllable current source; and
 a comparator connected to provide a detection output signal corresponding to the differentially peak-detected output signal and a reference signal.

2. The detector as recited in claim 1 wherein the two offset pairs of first and second signals provide first and second signals that are offset in opposite directions with respect to one another.

3. The detector as recited in claim 1 wherein offsets of the two offset pairs of first and second signals are generated by a detection reference generator.

4. The detector as recited in claim 3 wherein the detection reference generator provides an offset reduction based on the detection output signal being true.

5. The detector as recited in claim 1 wherein an offset error in the summation unit is reduced by an offset error cancellation controller.

6. The detector as recited in claim 1 wherein the complementary pair of overlap signals is provided by separate differential amplifiers.

7. The detector as recited in claim 6 wherein the complementary pair of overlap signals is provided on opposite phase outputs of the separate differential amplifiers.

8. The detector as recited in claim 1 wherein a charge or discharge rate of the controllable current source is adjusted by a current source controller and based on a state of the detection output signal.

9. The detector as recited in claim 1 wherein the reference signal is provided by a comparator reference generator and based on a state of the detection output signal.

10. A method of operating a signal detector, comprising:
 offsetting first and second input signals representing a differential input signal into two offset pairs of first and second signals;
 selecting the first signal from one of the offset pairs of first and second signals and the second signal from the other of the offset pairs during an overlap portion of the first and second signals to provide a complementary pair of overlap signals;
 detecting the complementary pair of overlap signals to provide a differentially peak-detected output signal using a differential pair of rectifiers employing a controllable current source; and
 comparing the differentially peak-detected output signal to a reference signal to provide a detection output signal.

11. The method as recited in claim 10 wherein offsetting the two offset pairs of first and second signals provides offsets that are in opposite directions with respect to one another.

12. The method as recited in claim 10 wherein offsetting the two offset pairs of first and second signals provides offsets that are generated by a detection reference generation signal based on digital-to-analog conversation.

13. The method as recited in claim 12 wherein the detection reference generation signal provides an offset reduction based on the detection output signal being true.

14. The method as recited in claim 10 wherein offsetting the two offset pairs of first and second signals provides a reduction in offset error through offset error cancellation based on digital-to-analog conversion.

15. The method as recited in claim 10 wherein providing the complementary pair of overlap signals uses separate differential amplifiers.

16. The method as recited in claim 15 wherein providing the complementary pair of overlap signals uses opposite phase outputs of the separate differential amplifiers.

17. The method as recited in claim 10 wherein a charge or discharge rate of the controllable current source is adjusted by a current source control signal that is based on a state of the detection output signal.

18. The method as recited in claim 10 wherein the reference signal is provided by a comparator reference generation signal that is based on a state of the detection output signal.

* * * * *